(12) United States Patent
Amick et al.

(10) Patent No.: US 6,337,366 B1
(45) Date of Patent: Jan. 8, 2002

(54) METHOD OF IMPROVING VISCOSITY STABILITY OF AQUEOUS COMPOSITIONS

(75) Inventors: David Richard Amick, Doylestown; James Watson Neely, Dresher, both of PA (US)

(73) Assignee: Rohm and Haas, Philadelphia, PA (US)

( * ) Notice: Subject to any disclaimer, the term of this patent is extended or adjusted under 35 U.S.C. 154(b) by 0 days.

(21) Appl. No.: 09/523,393

(22) Filed: Mar. 10, 2000

Related U.S. Application Data

(60) Provisional application No. 60/126,171, filed on Mar. 25, 1999.

(51) Int. Cl.[7] ............................ C08K 5/06; C08L 75/08; C08L 101/00
(52) U.S. Cl. ..................... 524/368; 524/35; 524/366; 524/505; 524/591; 524/800
(58) Field of Search ................................. 524/368, 366, 524/591, 800

(56) References Cited

U.S. PATENT DOCUMENTS 3,770,684 A * 11/1973 Singer et al.
4,180,491 A * 12/1979 Kim et al.

FOREIGN PATENT DOCUMENTS

EP 0 773 263 A 5/1997

OTHER PUBLICATIONS

Tarng et al., "Model Associative Thickener Aqueous Solutions," *Adv. Chem. Ser.*, vol. 248, pp. 305–341.

* cited by examiner

Primary Examiner—Tae H. Yoon
(74) Attorney, Agent, or Firm—James G. Vouros

(57) ABSTRACT

A method of improving the viscosity stability of an aqueous composition by the addition to the aqueous composition of a mixture of at least one multiphobe and at least one monophobe is disclosed. The method is particularly useful for stabilizing the viscosity of an aqueous composition containing at least one associative thickener, when surfactants or additives containing surfactants, such as for example colorants, particularly at high levels, are added to the aqueous composition.

15 Claims, 8 Drawing Sheets

METHOD OF IMPROVING VISCOSITY STABILITY OF AQUEOUS COMPOSITIONS

This is a continuation of U.S. Provisional Application No. 60/126,171 filed Mar. 25, 1999.

This invention relates to a method of improving the viscosity stability of aqueous compositions. The method of this invention is particularly applicable to improving the viscosity stability of aqueous compositions containing associative thickeners.

Associative thickeners are water soluble or water swellable polymers that have chemically attached hydrophobic groups. The associative thickeners operate to thicken systems to which they are added by the non-specific associations, such as adsorption on surfaces and aggregation in solution akin to micellization, between the hydrophobic groups on the thickener molecules and moieties on the other components in the system, similar to the non-specific associations of conventional surfactants.

Since the hydrophobic association exhibited by associative thickeners is non-specific, it is greatly influenced by the presence of surfactants and water miscible organic solvents. The hydrophobes of surfactants may compete for adsorption sites on particle surfaces, and can hinder or enhance associations between thickener hydrophobes, depending on the surfactant HLB. Once an associative thickener is completely desorbed from a particle, such as a latex particle, it can behave like a non-absorbing thickener and flocculate the latex by the volume restriction process.

A classic problem in paints containing associative thickeners is a drop in mid-shear (Krebs-Stormer) viscosity when colorants that contain high levels of surfactant are added. This is especially problematic when the paint will be tinted to a deep tone because a high level of surfactant generally accompanies the colorant. Colorants are added to paints in units of ounces of colorant per gallon of paint (hereinafter referred to as "oz/gal"). Light-tint (pastel) paints typically contain no more than 4 oz/gal of colorant. Mid-tone paints typically contain from greater than 4 oz/gal to 8 oz/gal of colorant. Deep tone paints typically contain 8 oz/gal up to 12 oz/gal of colorant.

Generally, it is possible to formulate a light tint base at a high enough mid-shear viscosity that colorants added to it will not depress the viscosity to an unacceptable degree. Combinations of associative thickeners have been found to be less sensitive to colorant addition than the individual thickeners alone, in some cases. However, neither of these solutions is completely satisfactory because they either require tedious reformulation, added cost or both, particularly in deep tone paints. The method and mixture containing a multiphobe and a monophobe of the present invention provide a solution to these problems.

Combinations of multiphobe, such as an associative thickener, with a monophobe, such as a surfactant, are known in many conventional aqueous compositions, such as, for examples in paints, adhesives and other coating compositions. For example, EP-A-0 773 263 discloses a substantially anhydrous composition containing a solid associative thickener and one or more surfactants and specifically notes on page 3, lines 47–48 that the mixture disclosed therein is inferior in pigmented coating compositions. Tarng et al., "Model Associative Aqueous Solutions," *Adv. Chem. Ser.*, Volume 48, pages 305–341 disclose mixtures of HEUR associative thickener with low molecular weight surfactants, namely either anionic (sodium dodecylbenzenesulfonate, MW=348) or nonionic ($C_{13}H_{27}(OCH_2CH_2)_9OH$, MW=596) surfactants.

None of these conventional aqueous compositions utilize a mixture of a select multiphobe component and a select monophobe component, wherein the ratio of the molecular weight of the monophobe to molecular weight of the multiphobe is relatively large in comparison to similar components in conventional aqueous systems. The unique mixture of the invention provides a solution to a serious problem that has eluded the paint industry for more than 20 years.

STATEMENT OF THE INVENTION

Figure 1:
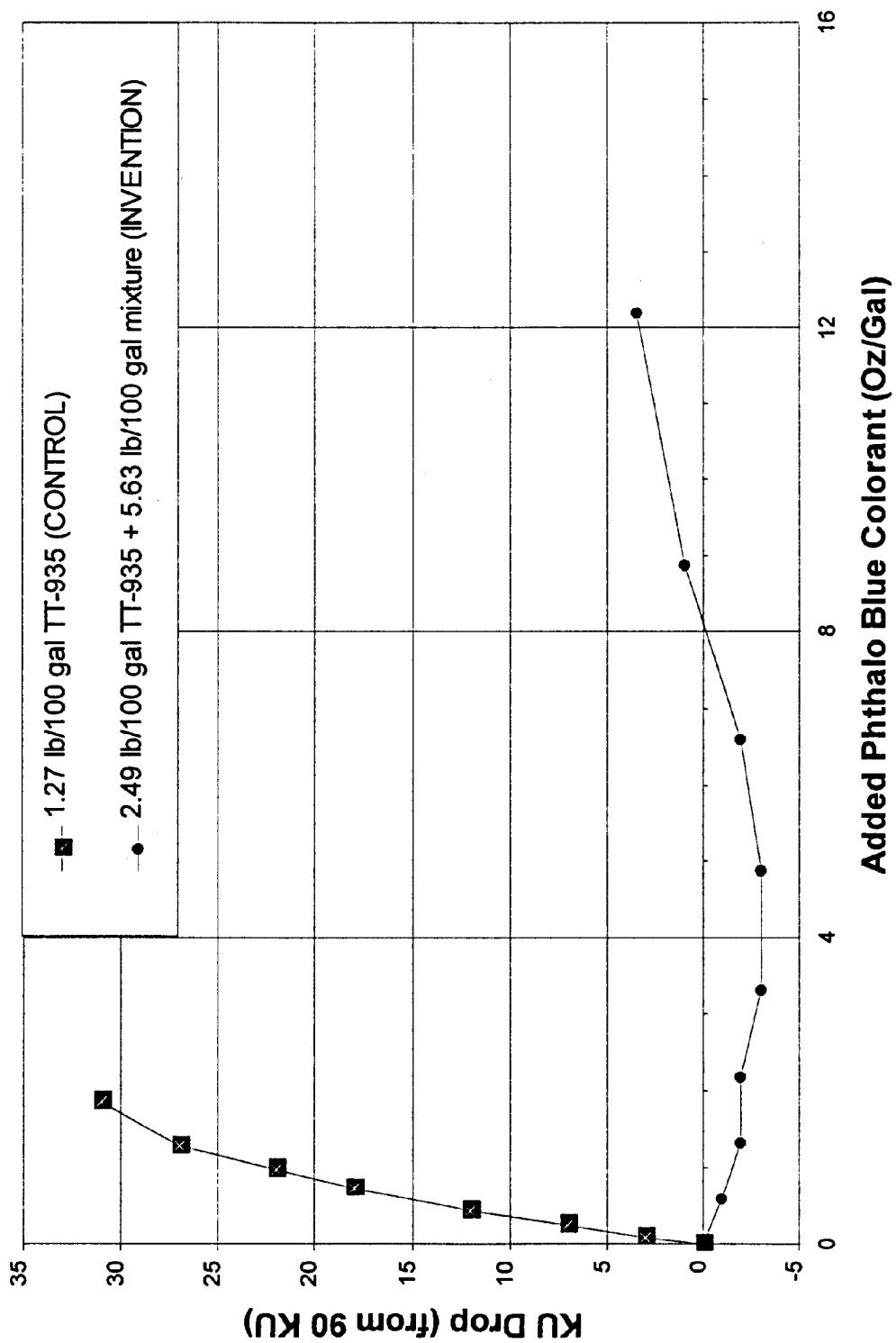
FIG. 1 is a plot of viscosity drop (KU) from initial KU=90 upon colorant addition v. level of phthalo blue colorant added (oz/gal) for a paint containing HASE associative thickener with and without the mixture of the invention.

The invention is directed a method of improving the viscosity stability of an aqueous composition by adding to the composition a mixture containing:
(a) at least one multiphobe, the multiphobe containing at least one hydrophilic segment and at least two hydrophobic segments;
wherein the number average molecular weight (Mn) of the multiphobe hydrophilic segment is greater than 2,000;

wherein the hydrophobicity of the multiphobe hydrophobic segment is sufficient to form non-specific hydrophobic associations; and (b) at least one monophobe, the monophobe containing at least one hydrophilic segment and only one hydrophobic segment;

wherein the Mn of the monophobe hydrophilic segment is at least half of the Mn of the multiphobe hydrophilic segment; and wherein the hydrophobicity of the monophobe hydrophobic segment is sufficient to form non-specific hydrophobic associations. The method of the invention is useful for stabilizing the viscosity of an aqueous composition containing at least one associative thickener. It is particularly useful for stabilizing the viscosity of an aqueous composition containing at least one associative thickener, when surfactants or additives containing surfactants, such as for example colorants, particularly at high levels, are added to the aqueous composition.

All values of the number average molecular weight (referred to herein as "Mn") used herein are determined by high pressure liquid chromatography (referred to herein as "HPLC"), unless otherwise specified.

"KU," as used herein, shall mean Krebs unit and is a measure of the mid-shear viscosity as measured by a Kreb-Stormer viscometer.

"Viscosity stability," as used herein, shall mean the ability of an aqueous composition to resist change in viscosity as measured by KU upon the addition of surfactant or a composition containing surfactant. A preferred viscosity stabilizer for latex paints must provide KU viscosity changes of less than about 10 units upon the addition of up to 12 oz/gal of colorant. A more preferred viscosity stabilizer for latex paints must provide KU viscosity changes of less than about 5 units upon the addition of up to 12 oz/gal of colorant.

As used herein, the prefix "(meth)acryl-" shall mean both the methacryl- and acryl- version of any monomer.

As used herein, the term "aqueous composition" shall mean a composition that is provided predominantly in water rather than organic solvent. It is contemplated, however, that a minor amount of organic solvent may be included in the composition and that the composition will nonetheless meet the definition of "aqueous composition."

As used herein, the term "base paint" shall mean a white paint to be colored or tinted. To enable this white paint to be colored or tinted to varying degrees, the base paint will contain various levels of titanium dioxide to permit proper coloring or tinting.

As used herein, the phrase "hydrophobic equivalent" shall mean a moiety that is quantitatively equivalent in hydrophobicity to its hydrocarbon analog, including heteroatom-substituted hydrocarbons and siloxane analogs. The quantitative measurement of hydrophobicity is described in Chapters 4 and 5 of C. Hansch and A. Leo, *Exploring QSAR-Fundamental and Applications in Chemistry and Biology*, (Washington, D.C.: American Chemical Society, 1995).

The multiphobes useful in the method of the invention are compounds containing at least one hydrophilic segment and at least two hydrophobic segments. The multiphobe is preferably a diphobe. The Mn of the multiphobe hydrophilic segment is greater than 2,000, preferably 3,000 to 20,000, and most preferably 4,000 to 10,000. The hydrophobicity of the multiphobe hydrophobic segment is sufficient to form non-specific hydrophobic associations. Preferably, the multiphobe hydrophobic segments contain a hydrocarbon moiety having at least 8 carbons or its hydrophobic equivalent.

The monophobes useful in the method of the invention are compounds containing at least one hydrophilic segment and only one hydrophobic segment. The monophobes may contain more than one hydrophilic segment, so that the monophobe may have the structure of hydrophilic segment-hydrophobic segment-hydrophilic segment. The monophobes of the invention may be nonionic, anionic, cationic or amphoteric. The Mn of the monophobe hydrophilic segment is at least half of the Mn of the multiphobe hydrophilic segment. Preferably, the Mn of the monophobe hydrophilic segment is greater than 2,000. The hydrophobicity of the monophobe hydrophobic segment is sufficient to form non-specific hydrophobic associations.

A variety of conventional techniques may be employed to determine whether the hydrophobicity of the hydrophobic segment of either the monophobe or multiphobe is sufficient to form non-specific hydrophobic interactions. These techniques generally show a dramatic change in the physico-chemical quantities of the monophobe or multiphobe material above and below the critical micelle concentration. Such techniques include, without limitation, light scattering (at 90° to incident light), osmotic pressure, turbidity, solubilization, magnetic resonance, surface tension, equivalent conductivity and self-diffusion. If the monophobe or multiphobe containing the hydrophobic segment exhibits this type of behavior (i.e., a dramatic change in a physico-chemical quantity) then the hydrophobicity of its hydrophobic segment is sufficient to form non-specific hydrophobic interactions.

Examples of the chemical structure of diphobes (I) and monophobes (II) useful in the invention are:

R—X—WS—X'—R'  (I)

R—X—WS—X'—Z  (II)

The R and R' represent the hydrophobic segments that are sufficient to form non-specific hydrophobic associations and may be the same or different. Suitable R and R' moieties include hydrocarbons having at least 8 carbon atoms, or the hydrophobic equivalent of at least 8 carbon atoms, such as aliphatic (linear or cyclic) hydrocarbon, aromatic, or aliphatic-aromatic combination (such as alkylphenyl), fluorinated versions of these structures, and other hydrophobic functionalities such as siloxanes.

Suitable Z moieties include hydrocarbons having no more than 7 carbon atoms, or the hydrophobic equivalent of having no more than 7 carbon atoms, preferably where Z=—H or —CH$_3$.

The WS represents the hydrophilic segment and is a water-soluble, polymeric moiety. Suitable WS are the polyethers, including polyethylene oxide (also known as polyethylene glycol), and copolymers of ethylene oxide with comonomers such as propylene oxide and butylene oxide, both of which can be incorporated randomly or in blocks. Other suitable monomers such as epoxides of α-olefins with at least 10 carbons (e.g., the epoxide of 1-decene) result in WS having a pendant hydrophobe(s) of at least 8 carbons, in which case R—X—WS—X'—R', contains more than two hydrophobic segments.

It should be appreciated that the composition of the R or R' and WS substituents depend upon the chemical composition of the reactants used to form the components of the mixture of the invention. For example, when WS is polyethylene oxide, reaction of the terminal hydroxyl functionality with diisocyanate, followed by reaction of the newly formed isocyanate terminal group(s) with an alcohol, leads to R, R' or Z that include hydrophobic contributions from both the diisocyanate and the alcohol.

The X and X' represent the connecting linkage groups and may be the same or different. Suitable linkages include: —O—(ether); —O—C(O)—NH—(urethane); —O—C(O)—(ester); —NY—(imino); —NY—C(O)—(amide); —NY—C(O)—NH—(urea); —S—(sulfide); —O—Si—(siloxane); where Y=R, R' or Z.

A mixture of different types of multiphobes may be used for the multiphobe component of the mixture of the invention provided that each different type of multiphobe individually meets the definition of multiphobe. Likewise, a mixture of different types of monophobes may be used for the monophobe component of the mixture of the invention provided that each different type of monophobe individually meets the definition of monophobe.

Suitable multiphobes include those diphobes disclosed in U.S. Pat. No. 3,770,684 including analogs prepared by reacting 1 mole of polyethylene oxide with 2 moles of R—NCO, to form a diphobe with urethane as the connecting linkage.

Other suitable multiphobes include those disclosed in GB-A-1,358,430. These materials have the structure:

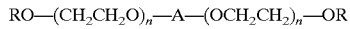

and are synthesized by connecting two hydroxyl-terminated nonionic surfactants with a diisocyanate (A).

Suitable monophobes include those formed by ethoxylation of hydrophobic alcohols or amines, as well as those prepared by reacting Z—O—(CH$_2$CH$_2$O)$_m$—H (where Z≠—H) with R—NCO.

The mixture of the invention may be prepared by synthesizing the monophobe and multiphobe components separately, and then combining. The mixture of the invention may also be prepared in situ in a single preparation. Suitable approaches include modifying the synthesis routes described in U.S. Pat. No. 3,770,684 and GB-A-1,358,430 by charging the reactants in the appropriate molar ratios, and using less than two moles of hydrophobe, on average, per final product molecule to produce a mixture of monophobe and multiphobe rather than pure multiphobe. For example, the mixtures of the invention shown in Example 8 were prepared by reacting 1 mole of polyethylene oxide with 1 mole of C$_{14}$—NCO to form a mixture of monophobe and multiphobe in a 2:1 molar ratio. Example 3 exemplifies the preparation of Mn 10,000 analog of this material. An equivalent mixture of monophobe and multiphobe, both containing hydrophilic segments of polyethylene oxide (Mn=10,000) could be prepared directly by reacting 1 mole each of C$_{14}$—pEO$_{Mn=5,000}$—OH and C$_1$—pEO$_{Mn=}$5,000—OH with 1 mole of hexamethylene diisocyanate.

The hydrophilic segments of the multiphobes and monophobes may contain branching. A mixture of multiphobe and monophobe containing branched hydrophilic segment may be prepared, for example, by reacting 1 mole of trifunctional polyethylene oxide (as prepared by ethoxylation of trimethylol propane) with less than 3 moles of R—NCO. Alternatively, a trifunctional isocyanate may be reacted with mixtures of RO—(CH$_2$CH$_2$O)$_m$—H and ZO—(CH$_2$CH$_2$O)$_n$—H.

Other suitable materials for forming the mixtures of the invention are water soluble polymers prepared via free radical polymerization. These water soluble polymers are polymers of water soluble monomers, but can contain some water insoluble monomers, provided that the resultant polymer is water soluble. The water soluble monomers include (meth)acrylic acid, (meth)acrylamide (and analogs having substituents on the amide nitrogen), vinyl alcohol (from polymerization of vinyl acetate, followed by hydrolysis), and hydroxyalkyl(meth)acrylate. The hydrophobic segments can be introduced in many ways, including:

(1) employing hydrophobic chain transfer agents such as dodecyl mercaptan;
(2) employing free radical-polymerizable hydrophobic monomers such as decyl methacrylate, the nonionic urethane monomers of U.S. Pat. No. 4,514,552, or the monomers of U.S. Pat. No. 4,384,096; and
(3) by post reaction, including, for example, esterification of polymeric acid functionality with hydrophobe-containing alcohols, such as dodecanol, or a nonionic surfactant. The performance of such mixtures is demonstrated in Example 10 for a molecular weight series of polyhydroxylethyl acrylate polymers which utilize equimolar amounts of n-dodecyl mercaptan (n-DDM) chain transfer agent and hydrophobe-containing monomer, as prepared according to Example 4. The n-DDM provides terminal C$_{12}$ hydrophobic segments, while pendent internal hydrophobes are provided by a monomer which contains C$_{12}$ functionality. The monophobes are those polymers which contain either a terminal or a pendant hydrophobe, but not both; most often it will contain only the terminal hydrophobe.

The molar ratio of multiphobe:monophobe in the mixture may range from 1:100 to 100:1. The preferred molar ratio of multiphobe:monophobe depends upon several factors, including the type of associative thickener, overall molecular weight of each component and the Mn of the hydrophobic segments of each component.

The selection of monophobe hydrophobic segments does not depend upon, nor is it dictated by, the type of multiphobe hydrophobic segments employed. Whether the mixture of the invention is prepared in situ or by synthesizing the monophobe and multiphobe components separately, the hydrophobic segments of the monophobe and multiphobe may be the same or different.

In an equivalent manner, the selection of monophobe hydrophilic segments does not depend upon, nor is it dictated by, the type of multiphobe hydrophilic segments employed.

The method of the invention is useful for improving the viscosity stability of aqueous compositions containing at least one associative thickener. Suitable associative thickeners include nonionic hydrophobically modified ethylene oxide urethane block copolymers (referred to herein as "HEUR"), hydrophobically modified alkali soluble polymers [including hydrophobically modified alkali soluble emulsions (referred to herein as "HASE") and hydrophobically modified poly(meth)acrylic acid], hydrophobically modified hydroxyethyl cellulose (referred to herein as "HMHEC"), hydrophobically modified poly(acrylamide), and mixtures thereof.

The method of the invention is useful for improving the viscosity stability of an aqueous composition containing at least one associative thickener, particularly upon the addition of a colorant containing high levels of surfactant. The method of the invention is not limited by the type of colorant that is added to the aqueous system and is useful for any colorant that contains surfactant or other additives that may interfere with the non-specific associations of the associative thickeners added to the aqueous system.

The multiphobe and monophobe may be added as a mixture directly to the aqueous composition, prior to, during or after the addition of the associative thickener. Alternatively, the monophobe and multiphobe may be added directly as a mixture to the associative thickener or colorant prior to addition to the aqueous composition.

The multiphobe and monophobe need not be added as a mixture and may be added separately to different components of the aqueous composition. For example, the monophobe may be provided in the latex, thickener, colorant or other formulation additive (such as with voided latex particles or with a complexing macromolecular organic compound having a hydrophobic cavity such as cyclodextrin or cyclodextrin derivatives) and the multiphobe added as a separate component. The monophobe may be provided during the synthesis of any of these components, such as, for example, the latex polymer polymerization. Also, for example, the multiphobe may be provided in the thickener or other formulation additive and the monophobe added as a separate component. It is, however, not preferred to provide the multiphobe as separate component with the latex because it may cause an unacceptably high viscosity.

If the multiphobe and monophobe are provided separately, wherein at least one of the mixture components is provided with another component of the aqueous composition, then the components may be mixed using conventional mixing equipment such as, for example, high speed dispersers, ball mills, sandmills, pebble mills, and paddle mixers.

The mixture or its component parts may be provided in the form of a dry powder, a premixed aqueous solution or a slurry or a solution in a water compatible solvent. In this regard, a solvent may be selected to prepare the mixture of the invention so that it may be directly mixed into the aqueous composition. The mixture may contain inert materials that do not interfere with the hydrophobic association of either component of the mixture.

The mixture may be present in the aqueous composition at a level of at least 0.05% by weight of solids, based on the weight of the aqueous composition. Preferably, the mixture may be present in the aqueous composition at a level of 0.1% by weight of solids, and most preferably, at a level of 0.5% by weight of solids, based on the weight of the aqueous composition. Alternatively, the mixture may be present in the aqueous. composition containing latex polymer at a level of at least 0.01% by weight of solids, based on the weight of the latex polymer solids. Preferably, the mixture may be present in the aqueous composition containing latex polymer at a level of about 0.05% to about 0.25% by weight of solids, based on the weight of the. latex polymer solids.

The method of the invention is useful for aqueous systems containing latex such as paints (including architectural paints and metal coatings such as automotive finishes), coatings, synthetic plaster, adhesives, sealants, and inks. While the method of the invention is particularly useful for aqueous systems containing latex, the method of the invention is also useful for improving the viscosity stability of other aqueous systems that do not contain a latex such as cosmetics, hair dyes, aqueous-based cutting oils, drilling fluids, packer fluids, cleaners, liquid detergents and fabric softeners, pesticide and agricultural compositions, personal care products (including shampoos, hair conditioners, hand lotions, hand creams, astringents, depilatories, and antiperspirants) and pharmaceutical formulations (including topical creams and hormone patches).

It has been found that the addition of the mixture to aqueous compositions does not compromise such properties as water resistance.

Some embodiments of the present invention will now be described in detail in the following Examples.

EXAMPLES

Example 1

Preparation of monophobe hydrophilic segment=pEO
(average Mn=~5,000)
hydrophobic segment=$C_{16}$ moiety Three hundred grams of toluene and 150 g (0.03 moles) of poly(ethylene glycol) monomethyl ether (average Mn=~5,000) were charged to a flask, then stirred and heated to azeotropically remove residual water via Dean Stark trap. The kettle temperature was reduced to 90° C., and 8.02 g (0.03 moles) of hexadecyl isocyanate was added, followed by 0.2 g of dibutyltin dilaurate catalyst. After stirring at 90° C. for 1 hour, the reaction was complete.

Example 2

Preparation of multiphobe hydrophilic segment=pEO
(average Mn=~4,600)
hydrophobic segment=$C_{16}$ moiety Four hundred fifty grams of toluene and 138 g (0.03 moles) of poly(ethylene glycol) (average Mn=~4600) were charged to a flask, then stirred and heated to azeotropically remove residual water via Dean Stark trap. The kettle temperature was reduced to 90° C., and 16.04 g (0.06 moles) of hexadecyl isocyanate was added, followed by 0.2 g of dibutyltin dilaurate catalyst. After stirring at 90° C. for 1 hour, the reaction was complete.

Example 3

In situ preparation of mixture 1 mole multiphobe: 2 moles monophobe hydrophilic segment=pEO
(average Mn=~10,000)
hydrophobic segment=$C_{14}$-NCO moiety Three hundred fifty grams of toluene and 200 g (0.02 moles) of poly(ethylene glycol) (average Mn=~10,000) were charged to a flask, then stirred and heated to azeotropically remove residual water via Dean Stark trap. The kettle temperature was reduced to 90° C., and 4.79 grams (0.02 moles) of tetradecyl isocyanate was added, followed by 0.2 g of dibutyltin dilaurate catalyst. After stirring at 90° C. for 1 hour, the reaction was complete.

Example 4

In situ preparation of mixture via free radical copolymerization

One hundred forty one grams of n-propanol was charged to a flask and warmed to 85° C., followed by the addition of 0.5 g of 2,2'-azobis-(2-methylbutyronitrile, sold under the tradename VAZO 67 by E. I. DuPont deNemours, Wilmington, Del. While stirring and maintaining a temperature of 85° C., a monomer mix [116 g (1.0 mole) of hydroxyethyl acrylate, 36.7 g (0.029 moles) of $C_{12}$—(EO)$_{23}$-methacrylate, 5.85 g (0.029 moles) of n-dodecyl mercaptan (n-DDM), and 91 g of n-propanol] was gradually added over 2 hours and an initiator solution (1.75 g of VAZO 67 in 25 g of propanol) was gradually added over the same 2 hours, plus an additional 0.5 hours. When the initiator feed was complete, the polymer solution was held an additional hour at 85° C., followed by cooling to room temperature. The final composition of the polymer was 76HEA/24$C_{12}$—(EO)$_{23}$-methacrylate//3.83 n-DDM.

Examples 5a–9 were conducted using a high quality semigloss paint of the following formulation scaled to 100 gallons of paint having a pigment volume content of 23.5% and 34.2% volume solids. The paint was thickened with the indicated associative thickener to a viscosity of 90+/−2 KU.

| | Weight (pounds) |
|---|---|
| Grind | |
| Water | 13.7 |
| Propylene Glycol | 65.0 |
| Dispersant (Tamol ™ 1124 (50%) from Rohm and Haas Company, Philadelphia, PA) | 5.4 |
| Defoamer (Foamaster VL from Henkel Corporation, Kankakee, IL) | 1.0 |
| Titanium dioxide (Ti R900 from E. I. DuPont deNemours, Wilmington, DE) | 268.0 |
| Total Grind | 353.1 |
| Letdown | |
| Water | 88.0 |
| Latex polymer binder (Rhoplex ™ SG-10M from Rohm and Haas Company, Philadelphia, PA) | 494.0 |
| Coalescent (Texanol from Eastman Chemical, Kingsport, TN) | 18.5 |
| Nonionic surfactant (Triton X-405 from Union Carbide Chemicals Corporation, Danbury, CT) | 2.5 |
| Defoamer (Foamaster VL from Henkel Corporation, Kankakee, IL) | 1.0 |
| Total Letdown | 604.0 |
| Total Master Paint (Grind + Letdown) | 957.1 |
| Thickener + Ammonia (if present) + Mixture of the Invention (if present) + Water | 108.2 |
| Total Paint (Master + Thickener + Ammonia + Mixture + Water) | 1065.3 |

The viscosity stabilizing capability in the following examples is determined by measuring the change in mid-shear (KU) viscosity upon the addition of Colortrend Phthalo Blue colorant (available from Creanova Inc., Piscataway, N.J.), a commonly used colorant that produces significant viscosity changes when added to most paint formulations containing an associative thickener. The mixtures of the invention provide viscosity stability improvement relative to a control paint containing the same thickener system. However, it is preferred for latex paints that the mid-shear (KU) viscosity change by less than 10 KU, and most preferably less than 5 KU, upon the addition of a maximum of 12 oz/gal colorant.

Example 5a

Viscosity stabilization in an aqueous composition containing latex and a HASE associative thickener The mixture of the invention was prepared in accordance with synthesis route described in Example 3 above, except that 172 g (0.02 moles) of poly(ethylene glycol) (Mn=8,600) was substituted for poly(ethylene glycol) (Mn=10,000). Type of associative thickener: HASE (Acrysol® TT-935 from Rohm and Haas Company, Philadelphia, Pa.)

| | Mixture of the Invention | |
|---|---|---|
| | Multiphobe | Monophobe |
| Hydrophilic Segment | Mn 8,600 pEO | Mn 8,600 pEO |
| Hydrophobic Segment | $C_{14}$ diphobe | $C_{14}$ |
| Molar Ratio | 1 | 2 |

The results of the change in mid-shear viscosity (initial viscosity=90 KU) are shown in FIG. 1 along with a control containing the same HASE thickener but no mixture of the invention.

Example 5b

Viscosity stabilization in an aqueous composition containing latex and a HEUR associative thickener The mixture of the invention was prepared by blending a monophobe prepared by the method of Example 1, with a multiphobe prepared according to the method of Example2, except that:

(1) the monophobe utilized 300 g (0.03 moles) of poly(ethylene glycol) monomethyl ether (Mn=10,000) and 8.87 g (0.03 moles) of octadecyl isocyanate in place of poly(ethylene glycol) monomethyl ether (Mn=5,000) and hexadecyl isocyanate, respectively; and (2) the multiphobe utilized 258 g (0.03 moles) of poly(ethylene glycol) (Mn=8,600) and 17.74 g (0.06 moles) of octadecyl isocyanate in place of poly(ethylene glycol) (Mn=4,600) and hexadecyl isocyanate, respectively.

Type of associative thickener
HEUR (Acrysol® RM-8W+Acrysol® RM-2020NPR from Rohm and Haas Company, Philadelphia, Pa.)

| | Mixture of the Invention | |
|---|---|---|
| | Multiphobe | Monophobe |
| Hydrophilic Segment | Mn 8,600 pEO | Mn 10,000 pEO |
| Hydrophobic Segment | $C_{18}$ diphobe | $C_{18}$ |
| Molar Ratio | 1 | 1 |

Figure 2:
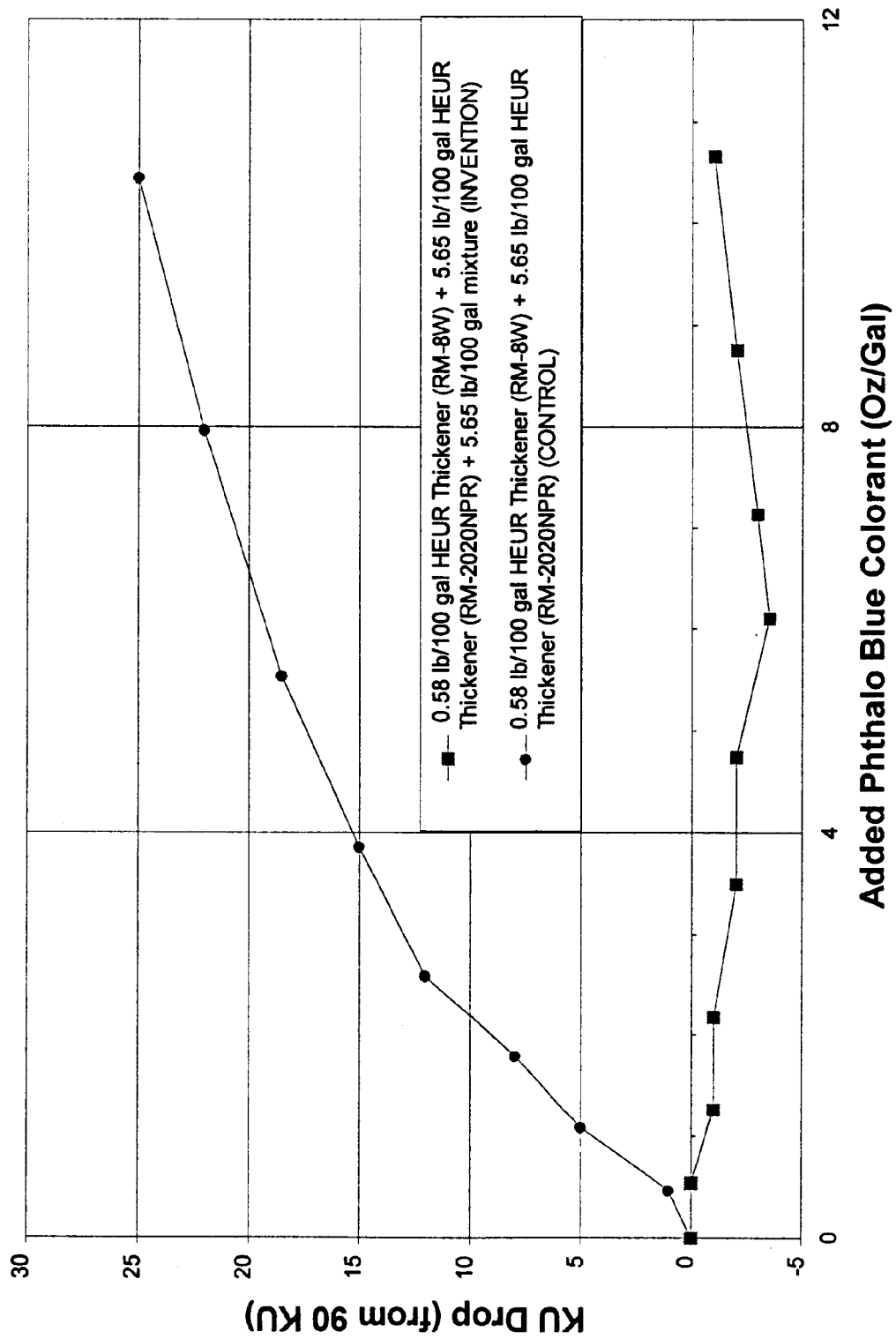
FIG. 2 is a plot of viscosity drop (KU) from initial KU=90 upon colorant addition v. level of phthalo blue colorant added (oz/gal) for a paint containing HEUR associative thickener with and without the mixture of the invention.

The results of the change in mid-shear viscosity (initial viscosity=90 KU) are shown in FIG. 2 along with a control containing the same HEUR thickener system but no mixture of the invention.

Example 6a

Monophobe required for viscosity stability

The mixture of the invention was prepared by blending the monophobe prepared by the synthesis route of Example 1 with the multiphobe prepared by the synthesis route of Example 2.

Type of associative thickener
HEUR (Acrysol® RM-8W+Acrysol® RM-2020NPR from Rohm and Haas Company, Philadelphia, Pa.)

| | Mixture of the Invention | | Comparative Multiphobe |
|---|---|---|---|
| | Multiphobe | Monophobe | No Monophobe |
| Hydrophilic Segment | Mn 4,600 pEO | Mn 5,000 pEO | Mn 4,600 pEO |
| Hydrophobic Segment | $C_{16}$ diphobe | $C_{16}$ | $C_{16}$ diphobe |
| Molar Ratio | 1 | 0.3 | — |

Figure 3:
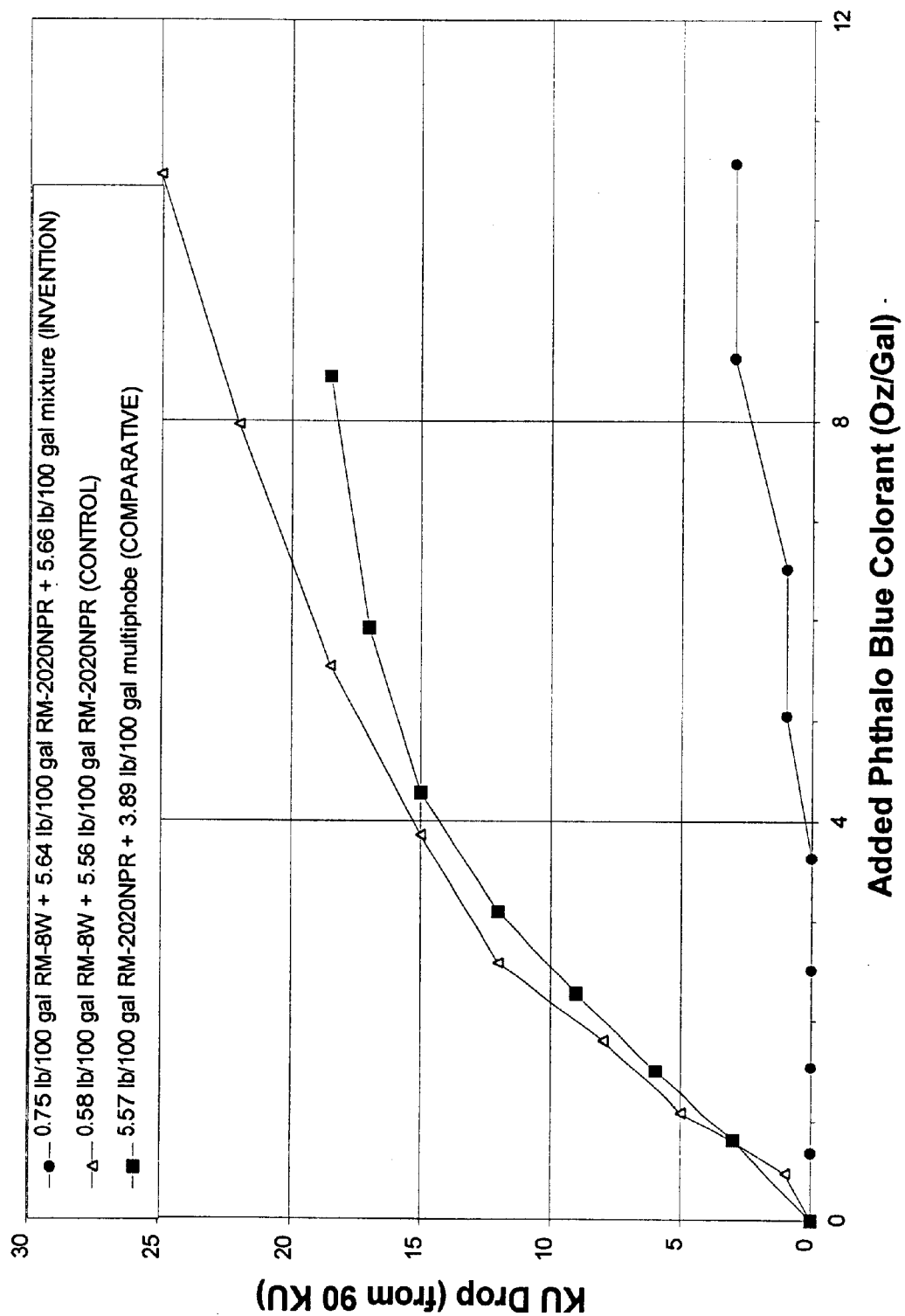
FIG. 3 is a plot of viscosity drop (KU) from initial KU=90 upon colorant addition v. level of phthalo blue colorant added (oz/gal) for a paint containing HEUR associative thickener without the mixture of the invention (control), without the monophobe component of the mixture of the invention (comparative) and with the mixture of the invention.

The results of the change in mid-shear viscosity (initial viscosity=90 KU) are shown in FIG. 3 along with a control containing the same HEUR thickener system but no mixture of the invention.

Example 6b

Multiphobe required for viscosity stability

Type of associative thickener
HASE (Design Rheology™ DR-75 from Rohm and Haas Company, Philadelphia, Pa.)

|  | Comparative Monophobe No Multiphobe |
| --- | --- |
| Hydrophilic Segment | Mn 4,400 pEO |
| Hydrophobic Segment | $C_{18}$ |
| Ratio | — |

Note: LP-100 is Lipopeg 100-S available from Lipo Chemicals Inc., Patterson, NJ 07504) and has a Mn of 4,400 (for 100 EO units).

Figure 4:
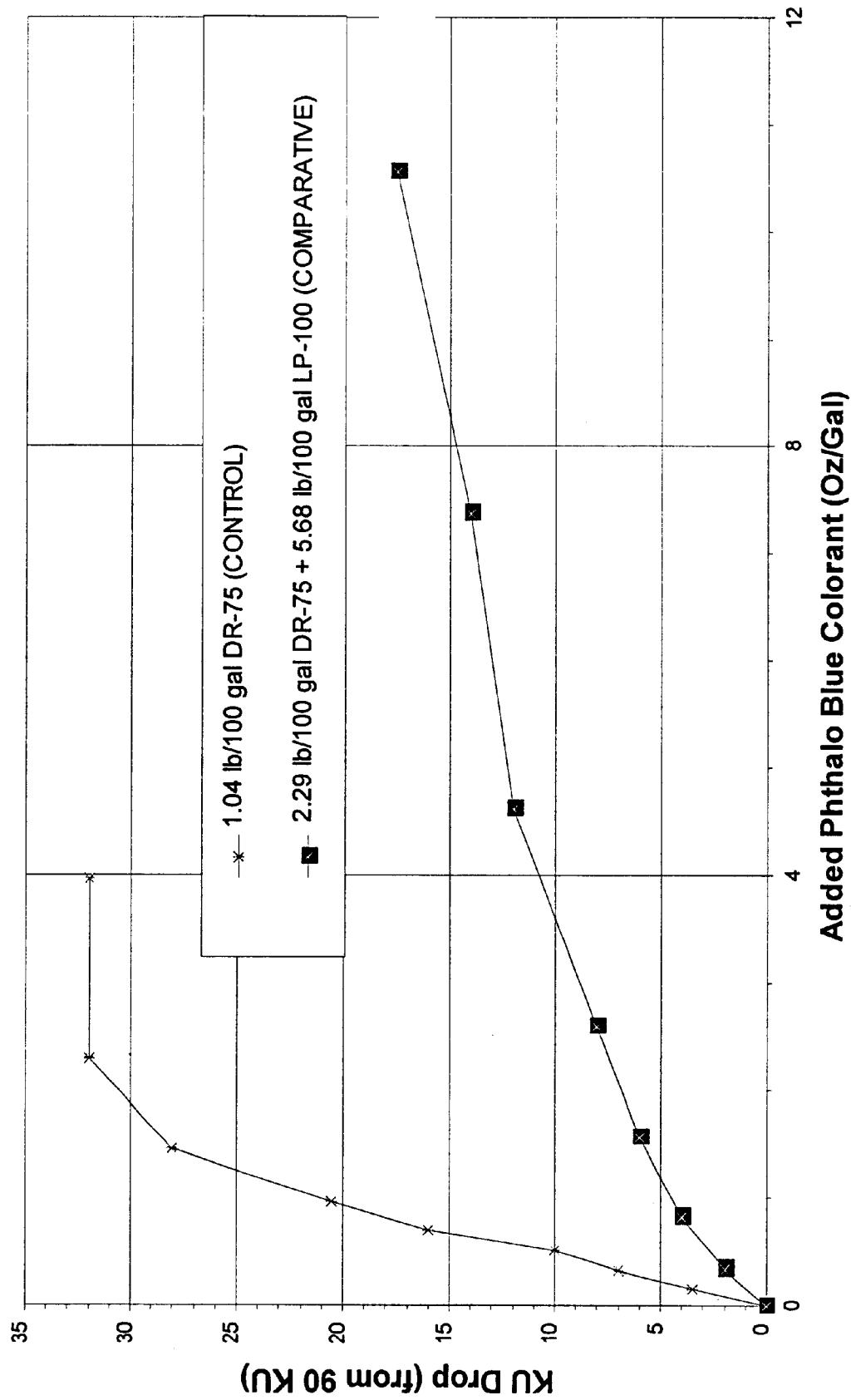
FIG. 4 is a plot of viscosity drop (KU) from initial KU=90 upon colorant addition v. level of phthalo blue colorant added (oz/gal) for a paint containing HASE associative thickener without the mixture of the invention (control) and without the multiphobe component of the mixture of the invention (comparative).

The results of the change in mid-shear viscosity (initial viscosity=90 KU) are shown in FIG. 4 along with a control containing the same HEUR thickener system but no mixture of the invention.

Example 7

Mn of the monophobe hydrophilic segment must be at least half of the Mn of multiphobe hydrophilic segment Each mixture was prepared by blending a monophobe prepared by the synthesis route of Example 1 with a multiphobe prepared by the synthesis route of Example 2, with substitutions as shown in the following table:

|  | Monophobe (following Example 1) | | Multiphobe (following Example 2) | |
| --- | --- | --- | --- | --- |
| Mixture | Poly(ethylene glycol) monomethyl ether | Isocyanate | Poly(ethylene glycol) | Isocyanate |
| 1 | Me-PEG-5,000 150 g (0.03 moles) | Tetradecyl-NCO 7.18 g (0.03 moles) | PEG-4,600 138 g (0.03 moles) | Tetradecyl-NCO 14.36 g (0.06 moles) |
| 2 | Me-PEG-10,000 300 g (0.03 moles) | Tetradecyl-NCO 7.18 g (0.03 moles) | PEG-4,600 138 g (0.03 moles) | Tetradecyl-NCO 14.36 g (0.06 moles) |
| 3 | Me-PEG-10,000 300 g (0.03 moles) | Tetradecyl-NCO 7.18 g (0.03 moles) | PEG-8,600 258 g (0.03 moles) | Tetradecyl-NCO 14.36 g (0.06 moles) |
| 4 COMPARATIVE | Me-PEG-2,000 60 g (0.03 moles) | Tetradecyl-NCO 7.18 g (0.03 moles) | PEG-4,600 138 g (0.03 moles) | Tetradecyl-NCO 14.36 g (0.06 moles) |
| 5 | Me-PEG-5,000 150 g (0.03 moles) | Hexadecyl-NCO 8.02 g (0.03 moles) | PEG-8,600 258 g (0.03 moles) | Hexadecyl-NCO 16.04 g (0.06 moles) |

Type of associative thickener

HASE (Design Rheology™ DR-75 from Rohm and Haas Company, Philadelphia, Pa.)

|  | Mixtures | | | |
| --- | --- | --- | --- | --- |
| Mixture Number | Multiphobe Phobe | Monophobe Phobe | Monophobe: Multiphobe Weight Ratio | Monophobe: Multiphobe Mn Ratio |
| 1 | $C_{14}$ | $C_{14}$ | 1.2:1 | 1.09:1 |
| 2 | $C_{14}$ | $C_{14}$ | 1.2:1 | 2.17:1 |
| 3 | $C_{14}$ | $C_{14}$ | 1.2:1 | 1.16:1 |
| 4 COMPARATIVE | $C_{14}$ | $C_{14}$ | 1.2:1 | 0.43:1 |
| 5 | $C_{16}$ | $C_{16}$ | 4:1 | 0.58:1 |

Figure 5:
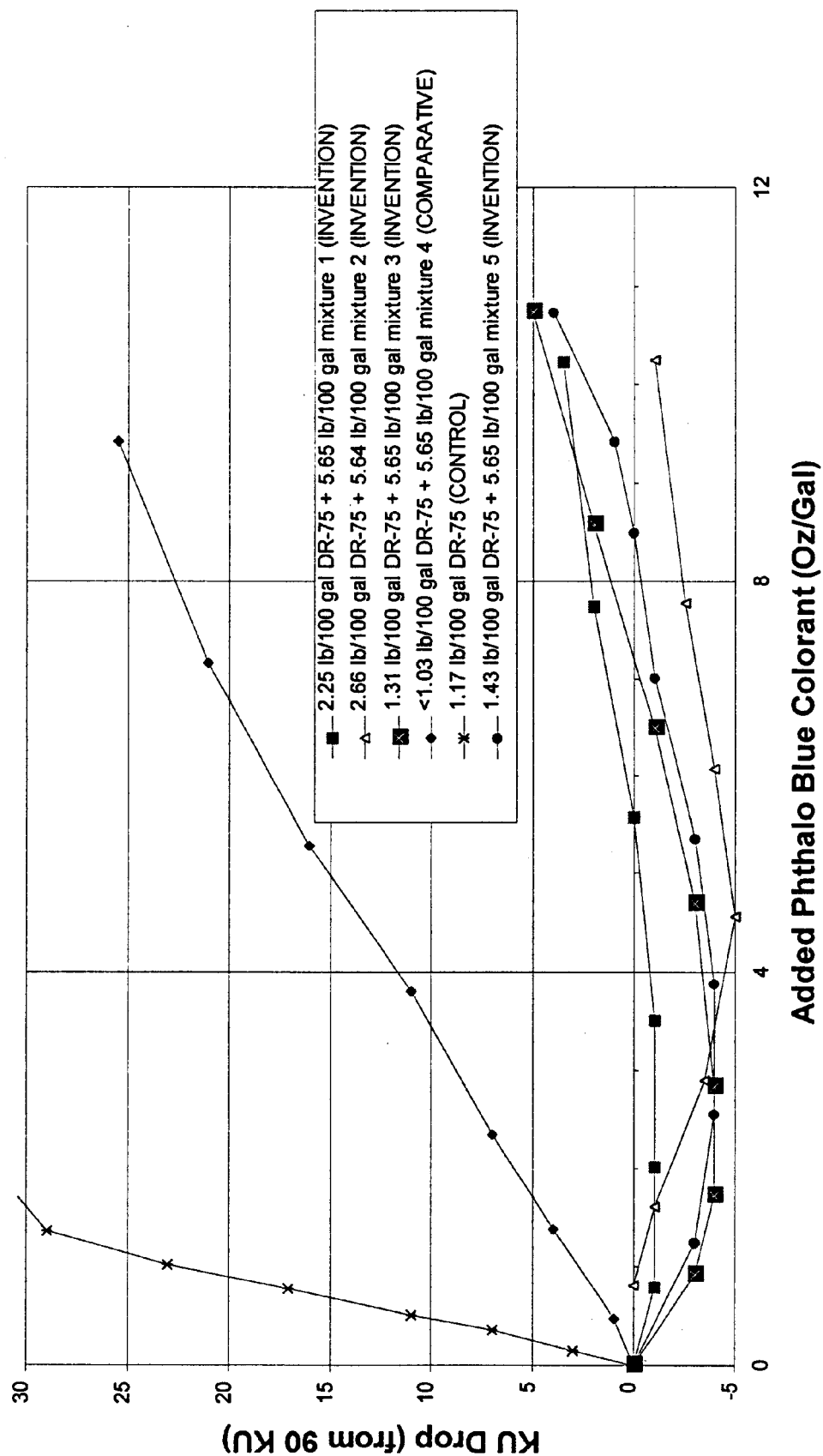
FIG. 5 is a plot of viscosity drop (KU) from initial KU=90 upon colorant addition v. level of phthalo blue colorant added (oz/gal) for a paint containing HASE associative thickener and various Mn ratios of monophobe hydrophilic segment:multiphobe hydrophilic segment (comparative and mixtures of the invention).

The results of the change in mid-shear viscosity (initial viscosity=90 KU) are shown in FIG. 5 along with a control containing the same HASE thickener but no mixture of the invention.

Example 8

Mn of Multiphobe Hydrophilic Segment

The mixture of the invention was prepared by the synthesis route of Example 3 [substituting 0.02 moles of the various poly(ethylene glycols)].

Type of associative thickener

HASE (Design Rheology™ DR-75 from Rohm and Haas Company, Philadelphia, Pa.)

|  | Mixtures of the Invention | |
| --- | --- | --- |
|  | Multiphobe | Monophobe |
| Hydrophilic Segments |  |  |
|  | Mn 2,000 pEO | Mn 2,000 pEO |
|  | Mn 4,600 pEO | Mn 4,600 pEO |

-continued

|  | Mixtures of the Invention | |
| --- | --- | --- |
|  | Multiphobe | Monophobe |
|  | Mn 8,600 pEO | Mn 8,600 pEO |
|  | Mn 10,000 pEO | Mn 10,000 pEO |
|  | Mn 12,000 pEO | Mn 12,000 pEO |
|  | Mn 20,000 pEO | Mn 20,000 pEO |
| Hydrophobic Segments | $C_{14}$ | $C_{14}$ |
| Molar Ratio | 1 | 2 |

Figure 6:
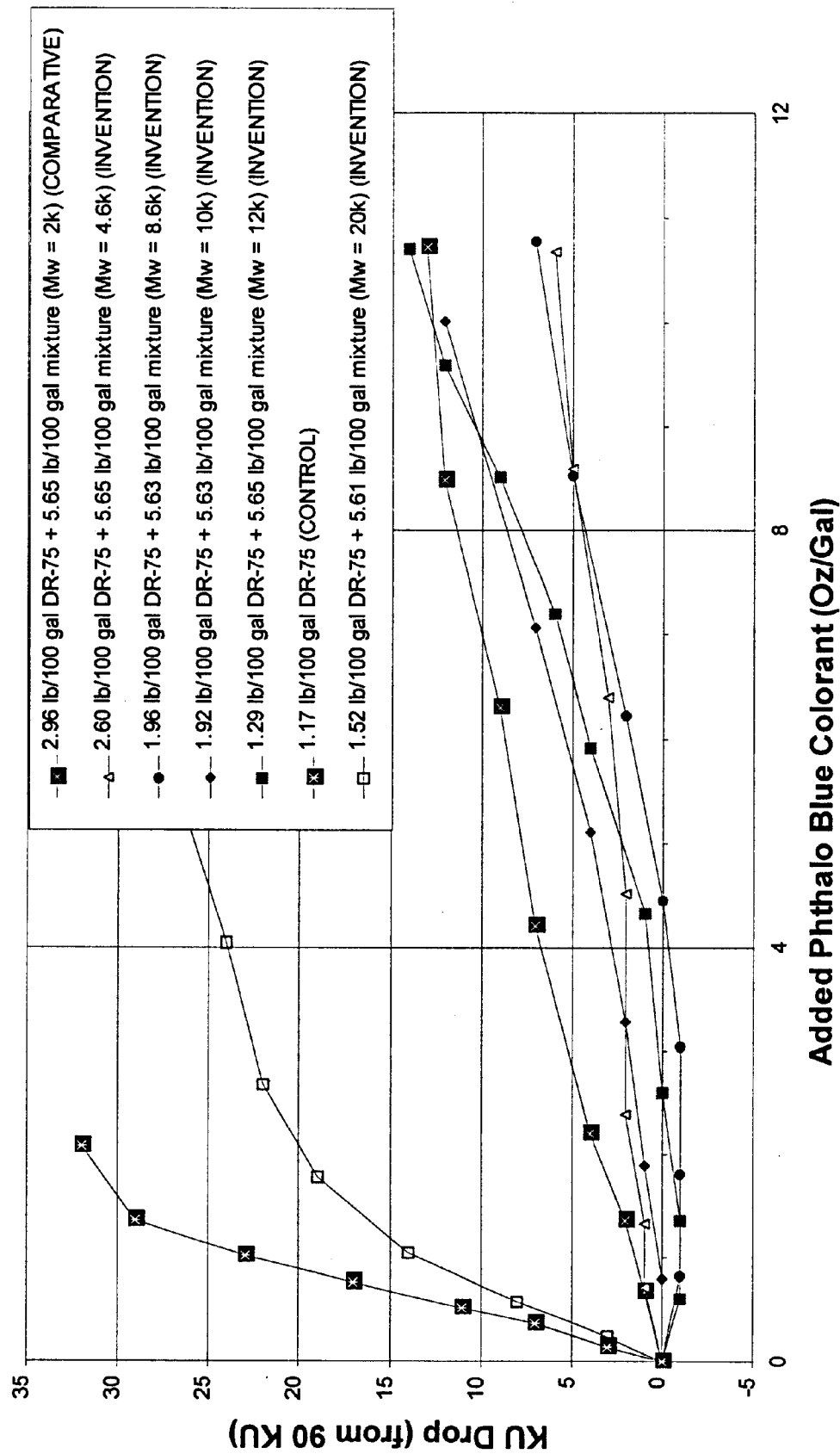
FIG. 6 is a plot of viscosity drop (KU) from initial KU=90 upon colorant addition v. level of phthalo blue colorant added (oz/gal) for a paint containing HASE associative thickener (control) and mixtures containing multiphobe hydrophilic segments having various Mn (comparative and mixtures of the invention).

The results of the change in mid-shear viscosity (initial viscosity=90 KU) are shown in FIG. 6 along with a control containing the same HASE thickener but no mixture of the invention.

Example 9

Hydrophobic segments must be large enough to provide non-specific hydrophobic associations The mixtures of the invention were prepared by the synthesis route of Example 3, except substituting 92 g (0.02 moles) of poly(ethylene glycol) (average Mn=~4,600) and 0.02 moles of the appropriate hydrophobic isocyanate for the poly(ethylene glycol) (average Mn=~10,000) and tetradecyl isocyanate, respectively.

Type of associative thickener
HASE (Design Rheology™ DR-75 from Rohm and Haas Company, Philadelphia, Pa.)

|  | Mixtures of the Invention | |
| --- | --- | --- |
|  | Multiprobe | Monophobe |
| Hydrophilic Segment | Mn 4,600 pEO | Mn 4,600 pEO |
| Hydrophobic Segments |  |  |
|  | $C_8$ diphobe | $C_8$ |
|  | $C_{12}$ diphobe | $C_{12}$ |
|  | $C_{14}$ diphobe | $C_{14}$ |
|  | $C_{16}$ diphobe | $C_{16}$ |
|  | $C_{18}$ diphobe | $C_{18}$ |
| Weight Ratio | 1 | 2 |

Figure 7:
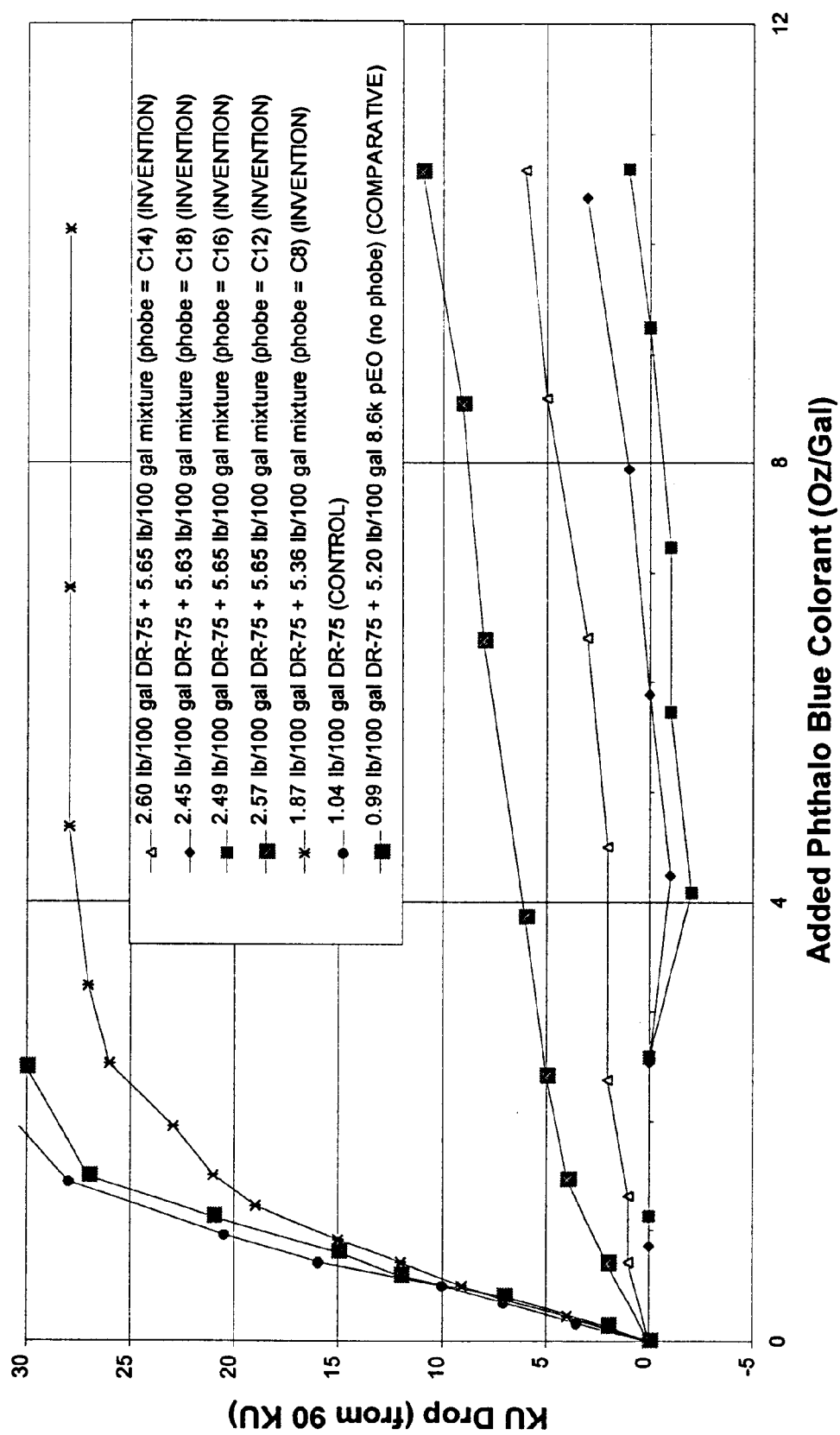
FIG. 7 is a plot of viscosity drop (KU) from initial KU=90 upon colorant addition v. level of phthalo blue colorant added (oz/gal) for a paint containing HASE associative thickener (control) and various mixtures containing monophobes and multiphobes where the hydrophobic groups vary in size (comparative and mixtures of the invention).

The results of the change in mid-shear viscosity (initial viscosity=90 KU) are shown in FIG. 7 along with a control containing the same HASE thickener but no mixture of the invention.

Example 10
Performance of mixtures of invention prepared by free radical polymerization The mixtures of the invention were prepared by the synthesis route of Example 4, with substitutions as shown in the following table:

|  | Composition | | Initial n-propanol (g) | Monomer Mix (g) | | | |
| --- | --- | --- | --- | --- | --- | --- | --- |
| Mixture | Theory Mn | HEA/phobe monomer//n-DDM |  | HEA | hydrophobic monomer | n-DDM | n-propanol |
| 1 | 16,000 | 92.65/7.35//1.17 | 235 | 174.0 | 13.80 | 2.20 | 60 |
| 2 | 12,000 | 90.48/9.52//1.52 | 250 | 174.0 | 18.30 | 2.93 | 55 |
| 3 | 8,000 | 86.34/13.66//2.18 | 283 | 174.0 | 27.53 | 4.39 | 44 |
| 4 | 4,000 | 75.97/24.03//3.83 | 141 | 116.0 | 36.70 | 5.85 | 91 |
| 5 | 2,000 | 61.23/38.77//6.18 | 268 | 116.0 | 73.45 | 11.70 | 49 |

Mixture 4 is the polymer prepared in Example 4. By utilizing the hydrophobic monomer and the hydrophobic chain transfer agent in equimolar amounts, the statistical theoretical distribution of hydrophobes will be about 3 parts multiphobe to 1 part monophobe.

Type of associative thickener
HASE (Design Rheology™ DR-75 from Rohm and Haas Company, Philadelphia, Pa.)

Figure 8:
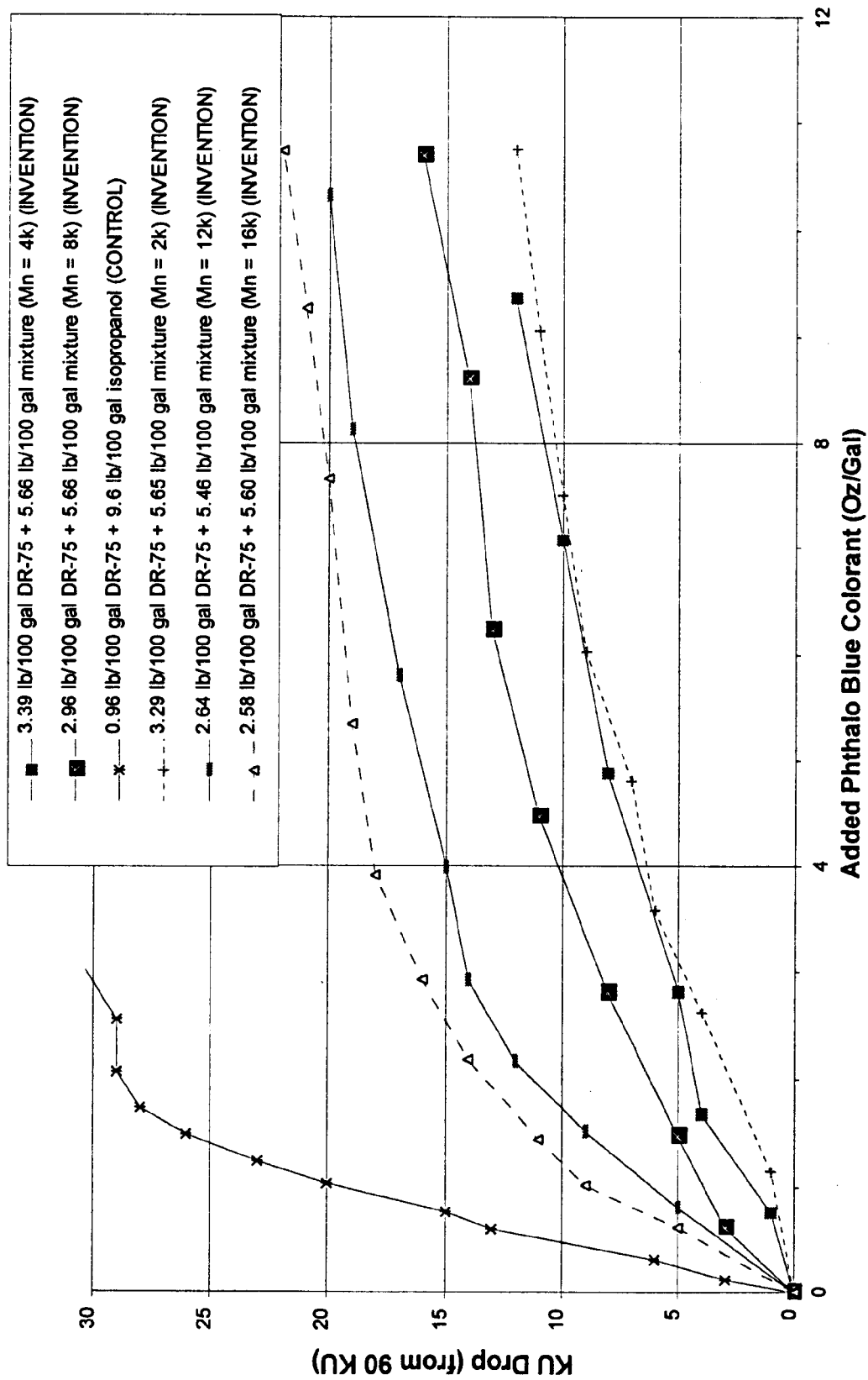
FIG. 8 is a plot of viscosity drop (KU) from initial KU=90 upon colorant addition v. level of phthalo blue colorant added (oz/gal) for a paint containing HASE associative thickener (control) and various mixtures containing monophobes and multiphobes synthesized via free radical polymerization (mixtures of the invention).

The results of the change in mid-shear viscosity (initial viscosity=90 KU) are shown in FIG. 8 along with a control containing the same HASE thickener and solvent but no mixture of the invention.

What is claimed is:

1. A method of improving the viscosity stability of an aqueous composition, comprising adding to said composition a mixture comprising:
    (a) at least one multiphobe, said multiphobe comprising at least one hydrophilic segment and at least two hydrophobic segments;
        wherein the Mn of said multiphobe hydrophilic segment is greater than 2,000;
        wherein the hydrophobicity of said multiphobe hydrophobic segment is sufficient to form non-specific hydrophobic associations; and
    (b) at least one monophobe, said monophobe comprising at least one hydrophilic segment and only one hydrophobic segment;
        wherein the Mn of said monophobe hydrophilic segment is at least half of the Mn of said multiphobe hydrophilic segment; and
        wherein the hydrophobicity of said monophobe hydrophobic segment is sufficient to form non-specific hydrophobic associations.

2. The method of claim 1 wherein said aqueous composition comprises a latex polymer.

3. The method of claims 1 or 2 wherein said composition comprises at least one colorant.

4. The method of claims 1 or 2 wherein said composition comprises at least one associative thickener.

5. The method of claim 4 wherein said composition further comprises at least one colorant.

6. The method of claim 1 wherein said multiphobe is a diphobe.

7. The method of claim 1 wherein said mixture is added at a level of at least 0.1% by weight of solids, based on the weight of the aqueous composition.

8. The method of claim 4 wherein said associative thickener is a thickener selected from the group consisting of nonionic hydrophobically modified ethylene oxide urethane block copolymers, hydrophobically modified alkali soluble emulsions, hydrophobically modified poly(meth)acrylic acids, hydrophobically modified hydroxyethyl cellulose, and hydrophobically modified poly(acrylamide), and mixtures thereof.

9. A method of improving the viscosity stability of an aqueous composition containing at least one latex polymer, comprising the step of adding to said composition a mixture comprising:
    (a) at least one multiphobe, said multiphobe comprising at least one hydrophilic segment and at least two hydrophobic segments;
        wherein the Mn of said multiphobe hydrophilic segment is greater than 2,000;
        wherein the hydrophobicity of said multiphobe hydrophobic segment is sufficient to form non-specific hydrophobic associations; and
    (b) at least one monophobe, said monophobe comprising at least one hydrophilic segment and only one hydrophobic segment;
        wherein the Mn of said monophobe hydrophilic segment is at least half of the Mn of said multiphobe hydrophilic segment; and
        wherein the hydrophobicity of said monophobe hydrophobic segment is sufficient to form non-specific hydrophobic associations; and (c) at least one associative thickener.

10. A method of improving the viscosity stability of an aqueous composition containing at least one latex polymer, comprising the step of adding to said composition a mixture comprising:
- (a) at least one multiphobe, said multiphobe comprising at least one hydrophilic segment and at least two hydrophobic segments;
  - wherein the Mn of said multiphobe hydrophilic segment is greater than 2,000;
  - wherein the hydrophobicity of said multiphobe hydrophobic segment is sufficient to form non-specific hydrophobic associations; and
- (b) at least one monophobe, said monophobe comprising at least one hydrophilic segment and only one hydrophobic segment;
  - wherein the Mn of said monophobe hydrophilic segment is at least half of the Mn of said multiphobe hydrophilic segment; and
  - wherein the hydrophobicity of said monophobe hydrophobic segment is sufficient to form non-specific hydrophobic associations; and
- (c) at least one complexing macromolecular organic compound having a hydrophobic cavity.

11. A method of improving the viscosity stability of an aqueous composition, comprising the step of adding to said composition at least one multiphobe, said multiphobe comprising one hydrophilic segment and at least two hydrophobic segments;
  wherein said aqueous composition, comprises:
  - (a) latex polymer; and
  - (b) at least one monophobe, said monophobe comprising at least one hydrophilic segment and only one hydrophobic segment;
    - wherein the Mn of said monophobe hydrophilic segment is at least half of the Mn of said multiphobe hydrophilic segment; and
    - wherein the hydrophobicity of said monophobe hydrophobic segment is sufficient to form non-specific hydrophobic associations; and
    - wherein the Mn of said multiphobe hydrophilic segment is greater than 2,000;
    - wherein the hydrophobicity of said multiphobe hydrophobic segment is sufficient to form non-specific hydrophobic associations.

12. A composition, comprising:
- (a) at least one multiphobe, said multiphobe comprising at least one hydrophilic segment and at least two hydrophobic segments:
  - wherein the Mn of said multiphobe hydrophilic segment is greater than 2,000;
  - wherein the hydrophobicity of said multiphobe hydrophobic segment is sufficient to form non-specific hydrophobic associations;
- (b) at least one monophobe, said monophobe comprising at least one hydrophilic segment and only one hydrophobic segment; and
- (c) at least one associative thickener;
  - wherein the Mn of said monophobe hydrophilic segment is at least half of the Mn of said multiphobe hydrophilic segment; and
  - wherein the hydrophobicity of said monophobe hydrophobic segment is sufficient to form non-specific hydrophobic associations.

13. A composition, comprising:
- (a) water;
- (b) latex polymer;
- (c) at least one multiphobe, said multiphobe comprising at least one hydrophilic segment and at least two hydrophobic segments;
  - wherein the Mn of said multiphobe hydrophilic segment is greater than 2,000;
  - wherein the hydrophobicity of said multiphobe hydrophobic segment is sufficient to form non-specific hydrophobic associations;
- (d) at least one monophobe, said monophobe comprising at least one hydrophilic segment and only one hydrophobic segment; and
- (e) at least one associative thickener;
  - wherein the Mn of said monophobe hydrophilic segment is at least half of the Mn of said multiphobe hydrophilic segment; and
  - wherein the hydrophobicity of said monophobe hydrophobic segment is sufficient to form non-specific hydrophobic associations.

14. A composition, comprising:
- (a) at least one multiphobe, said multiphobe comprising at least one hydrophilic segment and at least two hydrophobic segments;
  - wherein the Mn of said multiphobe hydrophilic segment is greater than 2,000;
  - wherein the hydrophobicity of said multiphobe hydrophobic segment is sufficient to form non-specific hydrophobic associations;
- (b) at least one monophobe, said monophobe comprising at least one hydrophilic segment and only one hydrophobic segment; and
- (c) at least one complexing macromolecular organic compound having a hydrophobic cavity;
  - wherein the Mn of said monophobe hydrophilic segment is at least half of the Mn of said multiphobe hydrophilic segment; and
  - wherein the hydrophobicity of said monophobe hydrophobic segment is sufficient to form non-specific hydrophobic associations.

15. A composition, comprising:
- (a) water;
- (b) latex polymer;
- (c) at least one multiphobe, said multiphobe comprising at least one hydrophilic segment and at least two hydrophobic segments;
  - wherein the Mn of said multiphobe hydrophilic segment is greater than 2,000;
  - wherein the hydrophobicity of said multiphobe hydrophobic segment is sufficient to form non-specific hydrophobic associations;
- (d) at least one monophobe, said monophobe comprising at least one hydrophilic segment and only one hydrophobic segment; and
- (e) at least one colorant;
  - wherein the Mn of said monophobe hydrophilic segment is at least half of the Mn of said multiphobe hydrophilic segment; and
  - wherein the hydrophobicity of said monophobe hydrophobic segment is sufficient to form non-specific hydrophobic associations.

* * * * *